United States Patent [19]

Glatzel

[11] Patent Number: 4,846,766
[45] Date of Patent: Jul. 11, 1989

[54] CURTAIN CORD TENSIONING DEVICE

[75] Inventor: Donald L. Glatzel, Barnet, United Kingdom

[73] Assignee: Cope & Timmins Ltd., London, United Kingdom

[21] Appl. No.: 228,386

[22] Filed: Aug. 4, 1988

[30] Foreign Application Priority Data

Aug. 6, 1987 [GB] United Kingdom ............... 8718662

[51] Int. Cl.⁴ ............................................. F16H 7/08
[52] U.S. Cl. ............................................. 474/138
[58] Field of Search ............ 474/109, 101, 136, 138; 242/147 R, 155 R; 223/115; 211/86

[56] References Cited

U.S. PATENT DOCUMENTS

| 55,344 | 6/1866 | Nell | 474/138 X |
|---|---|---|---|
| 66,084 | 6/1867 | Hessler | 474/138 |
| 86,634 | 2/1869 | Betts | 474/138 |
| 147,493 | 2/1874 | Fry | 474/138 |
| 161,407 | 3/1875 | Hall | 474/138 |

Primary Examiner—Thuy M. Bui
Attorney, Agent, or Firm—Notaro & Michalos

[57] ABSTRACT

A device for tensioning the cords of curtains, blinds or the like comprises a housing 1 and cover 3 defining a chamber 2 in which is slidably mounted a carriage 8 which has a boss 9 on which is rotatably mounted a pulley 10 for the cord 11 and a wheel 13 around which is wound a constant torque spring 17 the other shaped end of which is secured in a correspondingly shaped slot 18 formed in the end wall of the housing. The device is fixed to a wall or joinery by a screw 7 passing through a universally bore toggle 6.

9 Claims, 2 Drawing Sheets

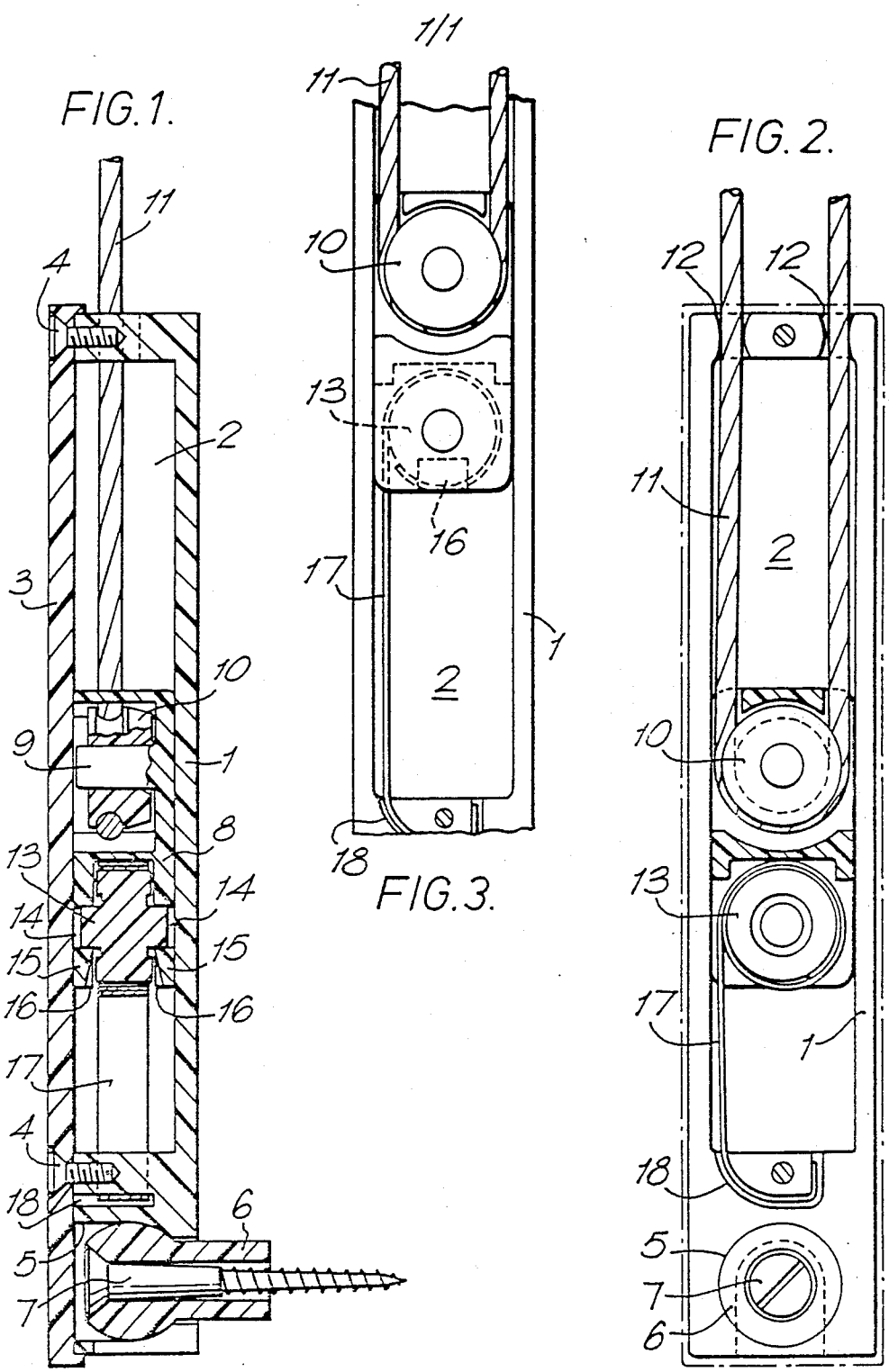

CURTAIN CORD TENSIONING DEVICE

BACKGROUND OF THE INVENTION

This invention relates to devices for tensioning cords which are used to operate curtains, blinds or the like. Such cords are generally in the form of a suspended loop whereby pulling either run of the loop causes the curtains to be opened or closed or the blind to be raised or lowered as the case may be. Instead of allowing the loop to hang loosely, it has been the practice for ease of use and aesthetically to fix the loop to an adjacent edge or surface by means of a spring device which holds the cord taut.

According to the invention there is provided a cord tensioning device comprising a housing defining an elongate chamber, a carriage longitudinally slideable within the chamber, said carriage including a pulley around which said cord passes and a constant torque spring connected between said carriage and a wall of said chamber such that the carriage generates a substantially constant tension in the cord regardless of the position of the carriage in the chamber.

The use of a constant torque spring provides useful benefits over previous tensioners which incorporated tension springs. The tension in the cord remains constant wherever the tensioning device is secured. Fixing of the device is made easier because of the constancy of tension and the fact that only a small extension is needed to raise the tension to its constant value.

SUMMARY OF THE INVENTION

The tensioning device of the invention may have the following preferred features:

(1) The spring may be wound around a boss formed in the carriage and be connected at its other end to the chamber wall.

(2) The spring may be wound around a wheel rotatably mounted in the carriage.

(3) The spring may be wound around the axle of the pulley.

(4) The end of the spring fixed to the chamber wall has a permanent shaped section which is received in a correspondingly shaped slot in the chamber wall.

(5) The elongate chamber and the carriage are generally rectangular.

(6) A universally pivotable bored toggle may be mounted at one end of the tensioning device and adapted to receive therethrough a fixing device for example a screw. This enables the device to find its own orientation when in use.

(7) The said chamber may be closable by means of a removable cover.

BRIEF DESCRIPTION OF THE DRAWING

In order that the invention may be readily understood, an embodiment thereof will now be described by way of example with reference to the accompanying drawings in which:

FIG. 1 is a longitudinal cross section through a tensioning device,

FIG. 2 is a top view thereof with the cover removed,

FIG. 3 is a scrap top view thereof in a different configuration, and

DESCRIPTION OF THE PREFERRED EMBODIMENT

Figure 4:
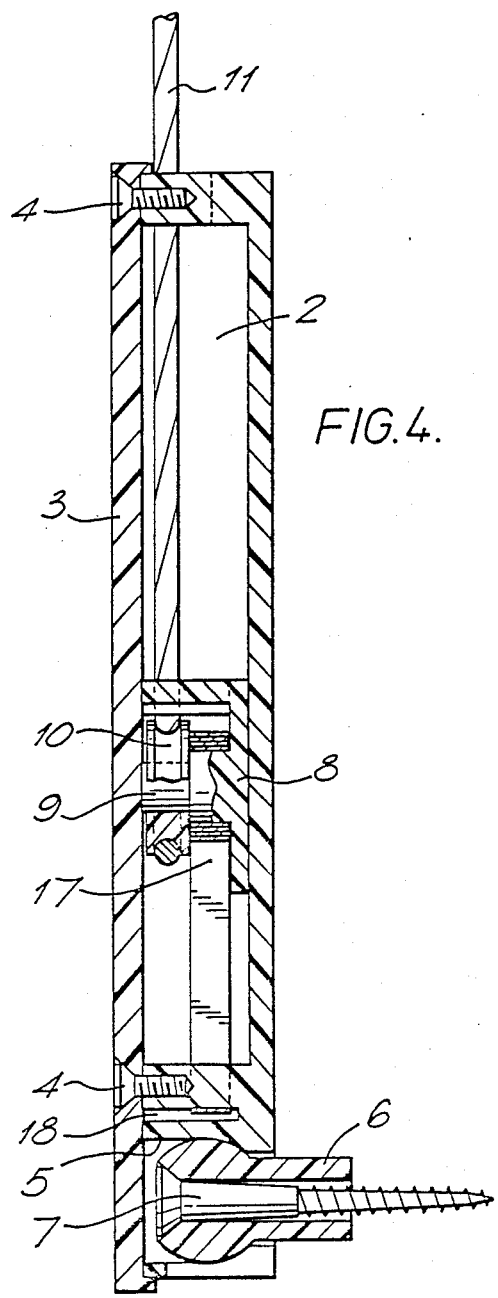
FIG. 4 is a sectional view similar to FIG. 1 of a modified embodiment.

The device comprises a generally box shaped housing 1 of rectangular cross section defining a chamber 2 and closable by a generally rectangular cover 3 fixed in place by two screws 4.

Disposed within a part-spherical/part-cylindrical bore 5 formed in one end of the housing 1 is a bored toggle 6 capable of universal pivoting movement and adapted to receive a fixing screw 7 whereby the device can be fixed to a wall, skirting board or other joinery or the like. By virtue of the ability to pivot universally, the device when fixed will be able to find its own orientation according to the cord it is to tension.

Within the chamber 2 is a longitudinally slideable carriage 8 having an upstanding boss 9 rotatably mounted about which is a pulley 10 about which is passed curtain cord 11. Two contoured slots 12 are formed in the end wall of the housing to allow the cord to be passed thereinto.

On the opposite side of the carriage 8 a rotatable pulley 13 is journalled in registering apertures 14 formed in opposed flanks 15 of the carriage. For ease of assembly tapered guideways 16 are formed in the flanks 15 which allow the pulley 13 to be press-fitted home with slight outwardly deformation of the flanks 15.

A constant torque spring 17 is disposed around pulley 13, the other, kinked end of which is secured in a correspondingly shaped slot 18 formed in the end wall of housing 1. As the carriage 8 is pulled upwards as seen in FIG. 2 towards the extended position shown in FIG. 3 the spring 17 unwinds and induces a constant restoring force on carriage 8 and thereby a constant tension in the cord 11.

Instead of the rotatable pulley 13, a fixed boss could be provided, similar to boss 9 since the spring 17 will retain its own shape therearound. In the modified embodiment shown in FIG. 4 however, the spring 17 is wound around the same boss 9 which mounts the pulley 10, made thinner to allow the assembly to fit in the chamber 2.

I claim:

1. A cord tensioning device comprising a housing defining an elongate chamber, a carriage longitudinally slideable within the chamber, said carriage including a pulley around which said cord passes and a constant torque spring connected between said carriage and a wall of said chamber such that the carriage generates a substantially constant tension in the cord regardless of the position of the carriage in the chamber.

2. A device according to claim 1 in which the spring is wound around an axle in the carriage and is connected at its other end to the chamber wall.

3. A device according to claim 2 in which the pulley is mounted on the same axle as the spring.

4. A device according to claim 1 in which the end of the spring fixed to the chamber wall has a permanent shaped section which is received in a correspondingly shaped slot formed in the end wall of the housing.

5. A device according to claim 4 in which the opposite end wall of the housing is formed with two contoured slots for the cord.

6. A device according to claim 5 including a universally pivotable bored fixing toggle at one end.

7. A device according to claim 4 in which the spring is wound around an axle in the carriage and is connected at its other end to the chamber wall.

8. A device according to claim 7 in which the pulley is mounted on the same axle as the spring.

9. A device according to claim 1 including a universally pivotable bored fixing toggle at one end.

* * * * *